(12) United States Patent
Manoharan et al.

(10) Patent No.: US 10,817,807 B2
(45) Date of Patent: Oct. 27, 2020

(54) GRAPHICAL USER INTERFACE TO REDUCE OBSCURED FEATURES

(71) Applicant: Google LLC, Mountain View, CA (US)

(72) Inventors: Rani S. Manoharan, Cambridge, MA (US); Marcin Z. Brodziak, Zurich (CH); Jiri Semecky, Adliswil (CH); Alejandro Diaz, San Francisco, CA (US); Marty R. Gardner, Melrose, MA (US); Stefan H. Pharies, Zurich (CH); Emmet J. Connolly, Zurich (CH); Konrad Gianno, Forch (CH)

(73) Assignee: Google LLC, Mountain View, CA (US)

( * ) Notice: Subject to any disclaimer, the term of this patent is extended or adjusted under 35 U.S.C. 154(b) by 468 days.

(21) Appl. No.: 15/299,204

(22) Filed: Oct. 20, 2016

(65) Prior Publication Data

US 2017/0185271 A1    Jun. 29, 2017

Related U.S. Application Data

(63) Continuation of application No. 13/606,557, filed on Sep. 7, 2012, now abandoned.
(Continued)

(51) Int. Cl.
*G06Q 10/02* (2012.01)
*G06F 3/0484* (2013.01)
(Continued)

(52) U.S. Cl.
CPC .......... *G06Q 10/02* (2013.01); *G06F 3/0482* (2013.01); *G06F 3/04845* (2013.01);
(Continued)

(58) Field of Classification Search
CPC .......... G06F 17/30241; G06F 3/04845; G06F 3/0482; G06F 16/3323; G06F 16/3325;
(Continued)

(56) References Cited

U.S. PATENT DOCUMENTS 8,600,577 B2   12/2013   Bourque et al.
8,751,272 B1   6/2014    Seybold et al.
(Continued)

OTHER PUBLICATIONS

Cockburn et al., "A Review of Overview+Detail, Zooming, and Focus+Context Interfaces", Dec. 2008, ACM Computing Surveys, vol. 41, No. 1, Article 2, pp. 31 (Year: 2008).*
(Continued)

*Primary Examiner* — Chau T Nguyen
(74) *Attorney, Agent, or Firm* — Dority & Manning, PA

(57) ABSTRACT

In responsive to receiving a user interaction with a map graphical user interface (GUI) of a client device, the system identifies an origin, and determines a map zoom level and map position based on the interaction. The system identifies and ranks candidate destinations for the origin. The system automatically selects destinations from the ranked candidates for inclusion in the map based on the zoom level and the position. Each selected destination for which a destination location indicator would be obscured in the map by an indicator of a higher ranked destination is automatically determined by the system. The system then deselects each destination for which a location indicator has been determined to be obscured by an indicator of a higher ranked destination, forming a revised set of destinations. The system transmits instructions to display a location indicator for each destination in the revised set to the client device.

20 Claims, 3 Drawing Sheets

Related U.S. Application Data

(60) Provisional application No. 61/531,958, filed on Sep. 7, 2011.

(51) Int. Cl.
    *G06F 3/0482* (2013.01)
    *G06Q 50/14* (2012.01)

(52) U.S. Cl.
    CPC .......... *G05B 2219/31475* (2013.01); *G05B 2219/34112* (2013.01); *G05B 2219/35334* (2013.01); *G06F 2203/04806* (2013.01); *G06Q 50/14* (2013.01)

(58) Field of Classification Search
    CPC ........ G06F 16/3328; G06F 16/24578; G06F 16/532; G06F 16/54; G06F 2203/04806; G01C 21/3667; G01C 21/367; G06Q 10/02; G06Q 50/14; G05B 2219/31475; G05B 2219/35334; G05B 2219/34112
    See application file for complete search history.

(56) References Cited

U.S. PATENT DOCUMENTS

| | | | |
|---|---|---|---|
| 2004/0128215 A1 | 7/2004 | Florance et al. | |
| 2004/0210491 A1* | 10/2004 | Sadri | G06Q 30/02 705/12 |
| 2005/0283389 A1 | 12/2005 | Widjaja et al. | |
| 2005/0288976 A1 | 12/2005 | Abrams et al. | |
| 2006/0129437 A1 | 6/2006 | Lee et al. | |
| 2006/0173617 A1 | 8/2006 | Sladky et al. | |
| 2007/0112507 A1* | 5/2007 | Bargeron | G01C 21/3667 701/425 |
| 2007/0198304 A1 | 8/2007 | Cohen et al. | |
| 2007/0198308 A1 | 8/2007 | Crean et al. | |
| 2008/0052151 A1 | 2/2008 | Xie et al. | |
| 2008/0172244 A1 | 7/2008 | Coupal et al. | |
| 2009/0002367 A1* | 1/2009 | Alexis | G06T 17/05 345/419 |
| 2009/0012799 A1 | 1/2009 | Hornthal et al. | |
| 2009/0204892 A1* | 8/2009 | Cheung | G01C 21/367 715/249 |
| 2009/0216633 A1* | 8/2009 | Whitsett | G06Q 30/02 705/14.36 |
| 2009/0231340 A1 | 9/2009 | Savornin | |
| 2009/0287546 A1 | 11/2009 | Gillespie et al. | |
| 2010/0017237 A1 | 1/2010 | Dalesandro et al. | |
| 2010/0042317 A1* | 2/2010 | Tajima | G06F 16/322 707/E17.109 |
| 2010/0198626 A1 | 8/2010 | Cho et al. | |
| 2011/0295499 A1* | 12/2011 | Nozoe | G01C 21/3635 701/457 |
| 2011/0301835 A1 | 12/2011 | Bongiorno | |
| 2012/0221595 A1 | 8/2012 | Slowe et al. | |
| 2012/0259669 A1 | 10/2012 | Stilwell et al. | |
| 2013/0035853 A1* | 2/2013 | Stout | G06F 16/29 701/438 |
| 2013/0073323 A1 | 3/2013 | Zacharia et al. | |
| 2014/0052714 A1 | 2/2014 | Brodziak et al. | |

OTHER PUBLICATIONS

U.S. Appl. No. 13/606,557 to Manoharan et al. filed Sep. 7, 2017.
Vetter, "U.S. Office Action issued in copending U.S. Appl. No. 13/606,557, filed Sep. 7, 2012", dated Sep. 9, 2015, 10 pages.
Vetter, "U.S. Office Action issued in copending U.S. Appl. No. 13/606,557, filed Sep. 7, 2012", dated Mar. 20, 2015, 11 pages.
Vetter, "U.S. Office Action issued in copending U.S. Appl. No. 13/606,557, filed Sep. 7, 2012", dated Apr. 14, 2016, 12 pages.
Vetter, "U.S. Office Action issued in copending U.S. Appl. No. 13/606,557, filed Sep. 7, 2012", dated Jul. 20, 2016, 12 pages.

* cited by examiner

US 10,817,807 B2

GRAPHICAL USER INTERFACE TO REDUCE OBSCURED FEATURES

CROSS REFERENCE TO RELATED APPLICATIONS

This application is a continuation of and claims priority to U.S. patent application Ser. No. 13/605,557, filed Sep. 7, 2012, and entitled "Providing Travel Information," which claims priority to U.S. Provisional Application No. 61/531,958, filed Sep. 7, 2011, and entitled "Providing Travel Information." The complete disclosure of the above-identified priority applications is hereby fully incorporated herein by reference.

TECHNICAL FIELD

The disclosed technology relates to a graphical user interface (GUI). Specific embodiments relate to a GUI to reduce obscured features.

Users can use various web sites to plan travel. Conventionally, a user navigates to either a web site corresponding to a particular provider (e.g., a specific airline) or to a web based travel site that provides access to several different providers. Once the user has identified an itinerary for travel, they can typically purchase the itinerary directly through the web site.

SUMMARY

The present disclosure includes description of embodiments of methods, systems, and computer program products directed to a graphical user interface to reduce obscured features. In response to receiving user interaction with a map GUI of a client computing device, a system identifies an origin, determines a map zoom level based on the interaction, and determines a map position map based on the interaction. The system identifies and ranks candidate destinations. The system automatically selects destinations from the ranked candidate destination for inclusion in the map based on the zoom level, the position, and the ranked candidate destinations. Each destination in the selected destinations for which a destination location indicator would be obscured in the map by a location indicator of a higher ranked destination is automatically determined by the system. The system then deselects each destination for which a destination location indicator has been determined to be obscured in the map by a location indicator of a higher ranked destination in order to x, to form a revised set of destinations. The system transmits instructions to display location indicator for each destination in the revised set of destinations to the client device, for display in the map.

BRIEF DESCRIPTION OF THE DRAWINGS

Like reference numbers and designations in the various drawings indicate like elements.

DETAILED DESCRIPTION

Figure 1:
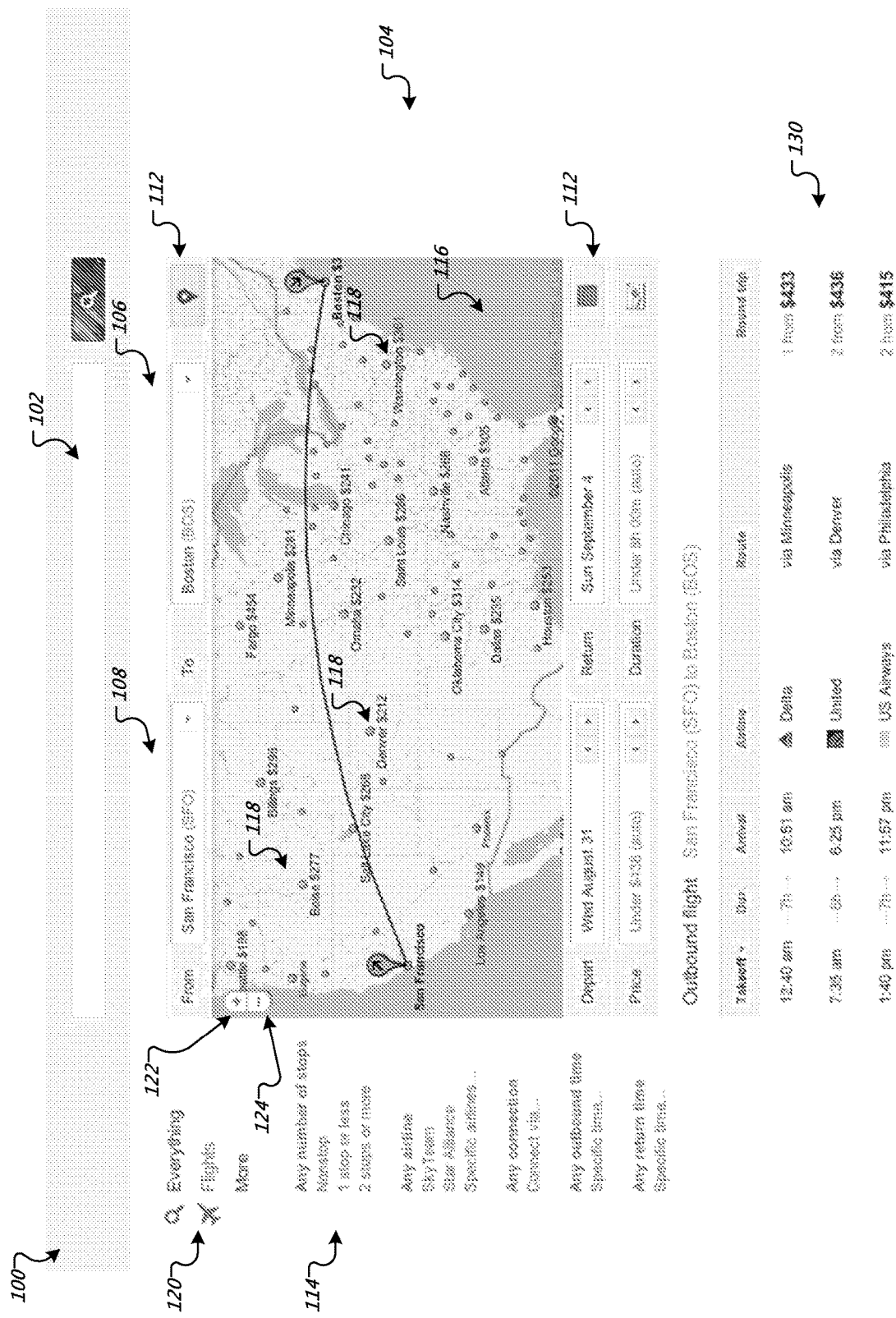
FIG. 1 is an example flight search interface.

A flight search interface is provided in response to a user input in a search interface. For example, a user search query can be identified as a flights-related query or a user can select a flights option in the search interface. The user can use the flight search interface to explore itinerary options. An itinerary, particularly a flight itinerary, is a collection of one or more flight segments that is available for purchase by the user. In particular, an itinerary identified through the flight search interface can be passed on to a booking site for purchase.

A flight segment is a specific nonstop flight. A user can take multiple segments to get between an origin and a destination. The origin is the city or airport from which the user begins a journey. The destination is a city to which the user stops, but is not a temporary transit point between segments. A multi city itinerary can have multiple destinations.

A routing between the origin and destination locations is a leg. Thus, a round trip ticket contains two legs, one in each direction. Each leg can include multiple segments. For example, a leg for a user flying from San Francisco to Tel Aviv can include a first segment from San Francisco to Los Angeles and a second segment from Los Angeles to Tel Aviv.

The flight search interface presents flight information based on a number of different dimensions. Dimensions are properties of a flight itinerary. Dimensions include, for example, flight origin and destination, departure and arrival dates and times, airlines, flight numbers, flight time, trip length, connecting airports, classes of service, number of stops, and baggage fees. Each dimension can be filtered to provide itineraries that contain particular dimension values.

In some implementations, dimensions are grouped according to particular criteria. For example, primary dimensions can include an origin, destination, departure date, return date, maximum price, and maximum duration. The primary dimensions can be presented together in a particular location of the flights search interface. For example, the primary dimensions can be positioned prominently in the flight search interface as the ones most likely to be modified by users to filter flight search results.

Secondary dimensions can include airlines, groups of airlines (e.g., OneWorld, SkyTeam, and Star Alliance), stops, connecting airports, outbound times, and return times. In some implementations, because these secondary dimensions are less often modified by users to filter flight search results, they can be positioned in a different location in the flight search interface from the more-frequently modified primary dimensions.

A user can explore flights using a map presented within the flight search interface that allows the user to view initial information about a number of different destinations from a specified origin. If one or more dimensions are filtered, the appearance of some of the destinations identified on the map can be altered to indicate that no flights exist to those destinations that satisfy the new dimension values. Further, in response to a user input altering the map, e.g., changing a level of zoom of the map or changing the position of the map to change the geographic area displayed, the destinations that are identified on the map can be altered.

FIG. 1 is an example flight search interface 100. The flight search interface 100 includes a search query input field 102, a dimensions portion 104, and a flight search results portion 130. The dimensions portion 104 includes primary dimensions 112, secondary dimensions 114, and map 116. The primary dimensions 112 include origin and destination dimensions. The map 116 can be used to specify the origin and destination dimensions. Alternatively, the origin and destination can be entered directly into an origin field 106 and a destination field 108, respectively. The search results portion 130 includes search results that satisfy each of the primary dimensions 112 and the secondary dimensions 114.

In the illustrated example, the origin has been specified as "San Francisco (SFO)" and the destination has been specified as "Boston (BaS)." In some implementations, the origin field 106 and the destination field 108 have been prepopulated because the flight search interface 100 was provided in response to receiving a search query seeking information about flights originating from San Francisco and destined for Boston. For example, the received search query may have been "flights from SFO to BaS" or "flights from San Francisco to Boston." Alternatively, a user may have entered the origin and destination directly into the respective fields. For example, the user may have selected a flights tab, e.g., flights tab 120, on a search engine interface, which resulted in the flight search interface 100 being provided without any prepopulated origin or destination information. Other primary dimensions 112 include departure and return dates, price, and duration. For example, the user can enter specific dates into respective fields for departure and return.

The map 116 includes indicators of particular destinations 118, shown in the map 116 as dots. The dots are optionally displayed with an associated price. For example, the associated price can indicate the price of a trip from the currently selected origin to the destination (e.g., a lowest determined price). Alternatively, the associated price can indicate the price of a round trip from the currently selected origin to the destination and back. In some implementations, the destinations 118 that are displayed are selected based on the currently selected origin, the current position of the map, and on the currently selected zoom level. In particular, the destinations that are displayed in the map can be a subset of the destinations that are accessible by flights from the currently selected origin.

In some implementations, a user can interact with the map to increase or decrease a level of zoom or to change the position of the map. For example, the user can select a control 122 to increase the level of zoom of the map, i.e., zoom in, or a control 124 to decrease the level of zoom, i.e., zoom out. In response to the user interaction, the particular destinations shown on the map can be adjusted. For example, in response to a user input zooming the map in, i.e., causing the map to only display a smaller portion of the United States, some destinations within the smaller portion that are not currently displayed may be indicated on the map. Conversely, in response to a user input zooming the map out to display multiple continents, some destinations within the United States may no longer be shown, and destinations on other continents may be added.

In some implementations, when a user places a cursor over a dot in the map 116, information is presented about the destination (e.g., as a tool tip or pop-up). The information can include a name of the destination or other destination information. Additionally, a user input selecting a destination can also result in additional destination information being presented within the map 116. This information can include, for example, a description of the destination city, images, weather, time zone, and distance from the airport to the city. If an associated price is not displayed with the destination, the associated price can be included in the information that is presented about the destination in response to the user input. In some implementations, if only an origin location is specified, selection of a particular dot on the map 116 automatically populates the destination field, which can then be used to generate corresponding search results.

The secondary dimensions 114 include a number of different dimensions and options for specifying values or value ranges for the dimensions. For example, the number of stops can be selected as any, 0, 1, or 2 or more. In another example, an airline dimension allows the user to specify any airline, selected airline groups, or specific individual airlines. In some implementations, selecting "specific airlines . . . " causes an expanded list to be presented, for example, within the secondary dimensions 114 or in a pop-up or overlay list (e.g., with checkboxes for each airline). Other secondary dimensions 114 can also be customized, for example, connection locations, and outbound and return times.

If the user selects a new value for a secondary dimension 114 or a primary dimension 112, e.g., by clicking on the value with an input device, the appearance of some of the dots on the map 116 can be altered to indicate that no flights exist from the specified origin to the destinations that those dots represent that satisfy the new dimension value, e.g., the new value of the dimension selected by the user. For example, if the user selects a "nonstop" value for a number of stops dimension and no nonstop flights can be identified between San Francisco and Omaha, the appearance of the dot representing Omaha can be altered to make the dot visually distinct from those dots representing locations to which nonstop flights from San Francisco are available (e.g., an empty circle for unavailable destinations compared to a filled-in dot for available destinations).

In some implementations, if, after the user modifies a dimension value, flights exist to a particular destination that satisfy each dimension value except for the value of the maximum price dimension, the dot representing that destination will nonetheless be displayed as available (e.g., as a filled-in dot), but no price will be displayed with the dot to indicate that no flights exist satisfying the currently selected maximum price value.

Figure 2:
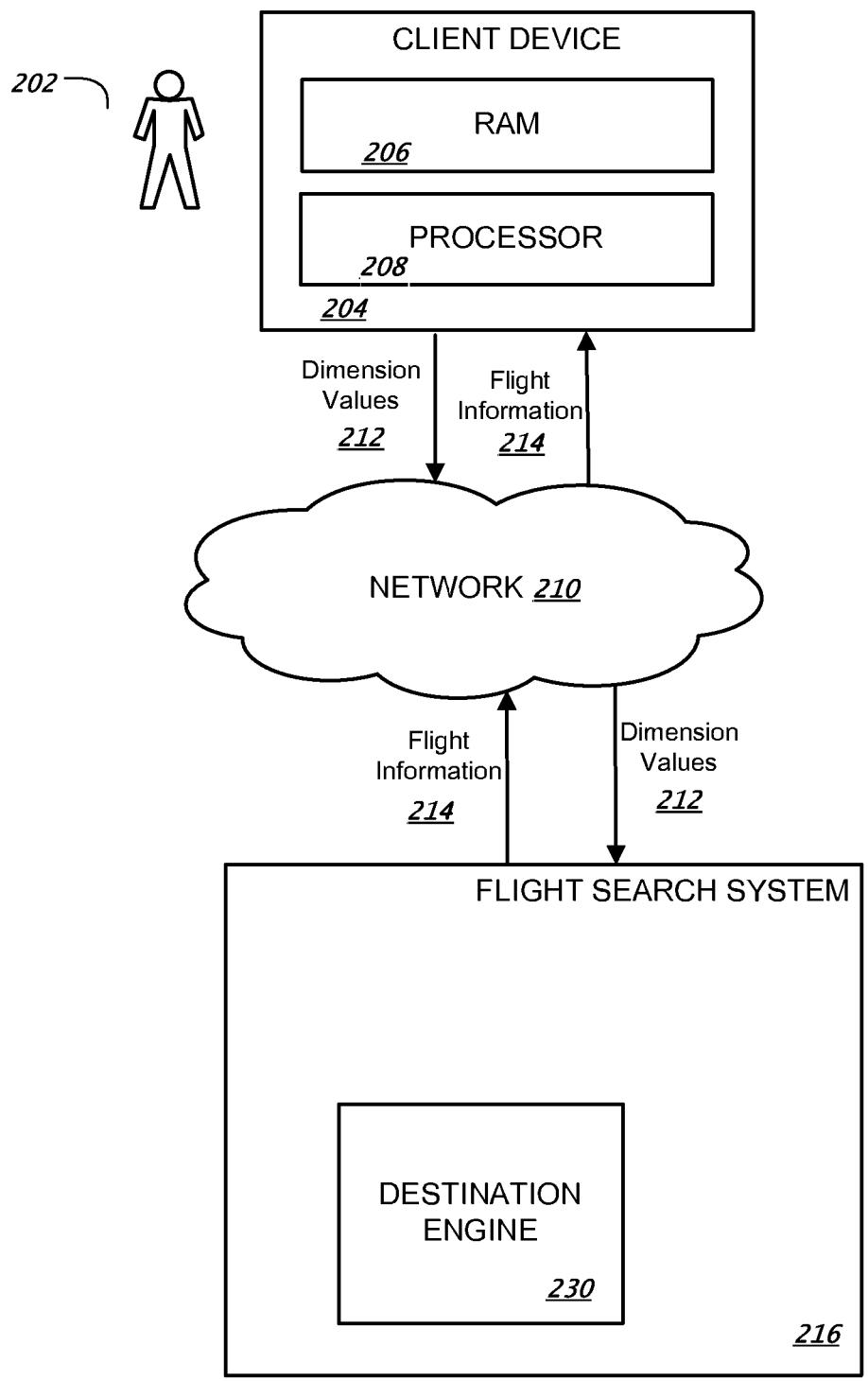
FIG. 2 shows an example flight search system.

FIG. 2 shows an example flight search system 216. The flight search system 216 is an example of an information retrieval system implemented on one or more computers in one or more locations, in which the systems, components, and techniques for presenting flight information described in this specification can be implemented.

A user 202 can interact with the flight search system 216 through a client device 204. For example, the client device 204 can be a computer coupled to the flight search system 216 through a network 210. The network 210 can be, for example, a local area network (LAN) or a wide area network (WAN), e.g., the Internet. The client device 204 will generally include a random access memory (RAM) 206 and a processor 208.

The flight search system 216 can receive one or more dimension values 212 from the client device 204. The flight dimension values can be, for example, specified by the user 202 through a flight search interface, e.g., flight search interface 100 of FIG. 1, presented on the client device 204. In response, the flight search system 216 can identify flight information 214 responsive to the received dimension values 212. For example, the flights search system 216 can locally store flight information, e.g., in a cache accessible to the flight search system 216, or can request flight information matching the dimension values from another location. The flight search system 216 can transmit the flight information 214 through the network 210 to the client device 204 for presentation to the user 202.

The flight information 214 responsive to the received dimension values 212 can include information to populate a map, e.g., the map 116 of the flight search interface 100 of FIG. 1. The information to populate the map can identify potential destinations accessible from an origin location specified by the received dimension values 212. The flight information can also include, for example, flight search results that satisfy each of the dimension values 212.

The flight search system 216 includes or can communicate with a destination engine 230. The destination engine 230 can identify the potential destinations to be displayed on the map based on the origin location identified by the dimension values 212. Additionally, in response to receiving a user input interacting with the map, e.g., changing the level of zoom of the map or panning the map to change the displayed geographic area, the destination engine 230 can modify the destinations to be displayed on the map.

Figure 3:
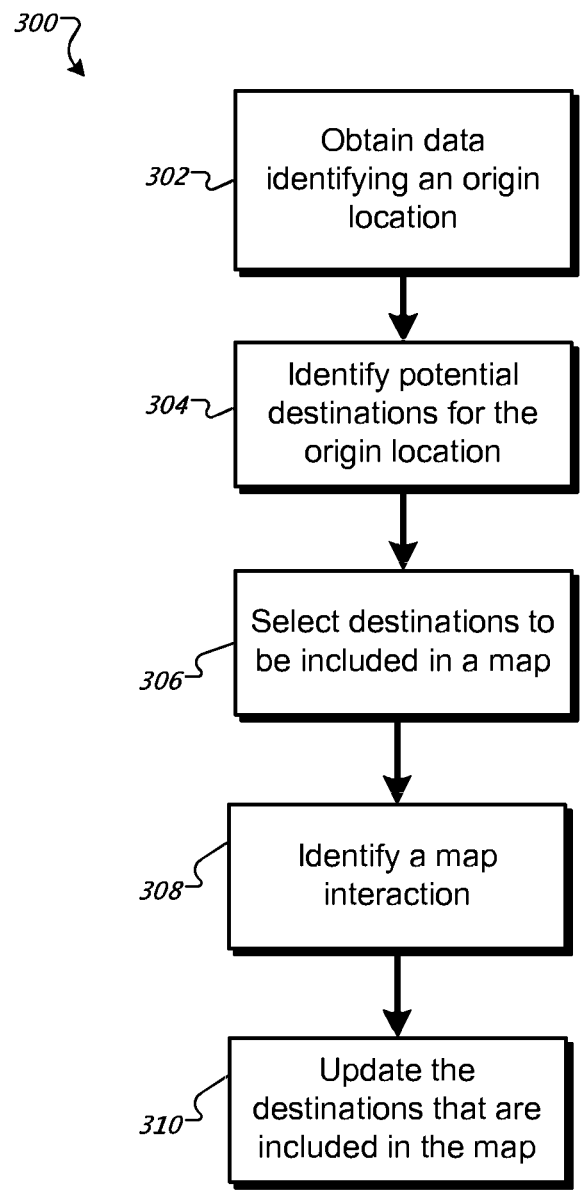
FIG. 3 is a flow diagram of an example process for determining locations to be shown in a map.

FIG. 3 is a flow diagram of an example process 300 for computing maximum price and duration limits. For convenience, the process 300 will be described with respect to a system, including one or more computing devices, that performs the process 300. For example, the process 300 can be performed by a flight search system, e.g., flight search system 216 of FIG. 2.

The system receives data specifying an origin location (302). The origin location can be, for example, specified by a user through a flight search interface presented on a client device. The data can optionally also identify one or more other flight dimension values.

The system identifies potential destinations for the origin location (304). The potential destinations are destinations that are accessible by flights from the origin location. In some implementations, the potential destinations must be accessible by non-stop flights from the origin location. Alternatively, the potential destinations can include destinations that are accessible by either a non-stop flight or a flight having one or more connections.

The identified destinations can be ranked based on a popularity metric for the origin location. For example, the popularity metric for a given destination can be computed based at least in part on historical data that identifies the number of passengers travelling to the destination from the origin location, how frequently the destination appears in the same flight search query as the origin, or both. In some implementations, the system ranks the identified potential destinations based on the metric. Alternatively, the system obtains a ranked list of potential destinations.

The system selects potential destinations for inclusion in a map presented to a user (306). The map can be presented as part of a flight search interface, e.g., the flight search interface 100 of FIG. 1. The system can select the destinations to include based on a current level of zoom of the map, a current position of the map, and the ranking of the cities based on the popularity metric.

In some implementations, for each of the potential destinations, the system may determine whether that potential destination's location would be visible on the map given the current position of the map and the current level of zoom. That is, if the map is currently positioned and zoomed so that only the Western Hemisphere is visible, the system would not determine to display potential destinations in the Eastern Hemisphere (e.g., South Africa or Germany).

If a potential destination's location would be visible on the map, the system determines whether the representation of the destination on the map, e.g., the indicator of the destination's location or any other information displayed with the indicator on the map, would be obscured by the representation of one or more destinations that have higher popularity rankings. If the representation of the destination on the map is obscured by another, more popular destination, the system determines not to include the destination on the map. Thus, for example, if the current level of zoom is set so the entire world is shown and New York ranks higher than Boston based on the popularity metric for the origin location, Boston will not be displayed on the map if the indicator, e.g., a dot, representing Boston on the map overlaps with the indicator representing New York. In some implementations, if any of the information displayed with the dot representing Boston, e.g., location name or price of a flight, overlaps with the any of the information displayed with the dot representing New York, Boston will not be displayed. In some implementations, a representation of a first destination is determined to overlap the representation of a second destination if the distance on the map between the indicator of the first destination's location (or any other information displayed with the indicator) and the indicator of the second destination's location (or any other information displayed with the indicator) is below a specified threshold value.

If the destination would be visible on the map and would not be obscured by the representation of any other, more popular destinations, the system determines that the destination should be included in the map.

The system identifies a map interaction (308). For example, the map interaction can be a user input increasing or decreasing the level of zoom of the map. Alternatively, the map interaction can be a user input changing the position of the map, i.e., changing the area shown on the map by panning the map without altering the level of zoom.

The system updates the destinations that are included in the map based on the map interaction (310). In some implementations, once the system determines the destinations that are to be included in the map for a particular zoom level, the system automatically determines that each of those destinations should also be displayed at higher zoom levels, i.e., at each zoom level that has a greater magnification than the current zoom level. Thus, in response to a user input increasing the level of zoom of the map, the system determines to display the destinations shown for the previous zoom levels that are still visible on the map in the current zoom level.

The system then identifies additional potential destinations that are visible at the current zoom level that were not previously included. The system can determine whether those potential destinations should be displayed on the map based on whether their representations on the map would be obscured by the representation of one or more destinations that have higher popularity rankings, e.g., as described above.

In response to a user input that does not change the level of zoom but pans the map to show a different area, the system updates the map to only show potential destinations that are visible in the current position of the map. When the position of the map is changed, the system may identify additional potential destinations that are accessible from the origin location and would be visible in the map as currently positioned. The system may then determine whether to include those destinations in the map as described above.

Alternatively, in some other implementations, when initially determining which potential destinations to include in the map for a given level of zoom and a given origin location, the system may determine the potential destinations that should be displayed irrespective of the position of the map. That is, the system may determine whether a potential destination should be included based on whether or not the destination overlaps with another, more popular destination at the given level of zoom, and then determine whether that destination is viewable on the map at the current position. Those destinations that are not viewable on the map but do not overlap another, more popular destination are not included in the map but are stored by the system. In these implementations, when the user changes the position of the map, the system determines which of the stored destinations are now visible given the new position, and selects those destinations to be included in the newly-positioned map.

In some implementations, of the destinations that are selected for inclusion in the map, the system determines how those destinations should be represented in the map based on whether the system can identify flights to the destinations that satisfy particular current dimension values. For example, for each destination selected for inclusion in the map, the system can obtain a minimum price for a flight to that destination that satisfies each of the other current dimension values. The destinations that satisfy each of the current dimension values, i.e., including the current maximum price value, can be represented in the map using a first type of indicator, e.g., a filled-in dot, that is displayed with the minimum price. This indicates to a user that flights are available to those destinations that satisfy each of the current dimension values, including the current maximum price.

The destinations that that satisfy each of the current dimension values except the current maximum price value, i.e., because the minimum price of a flight to the destination satisfying each of the other dimension values exceeds the current maximum price value, can be represented in the map using the first indicator, but without the minimum price being displayed. This indicates to the user that while flights are available to those destinations that satisfy each of the current non-price dimension values, no flights could be identified that also satisfies the current maximum price.

The destinations for which no flights could be identified that satisfy each of the nonprice dimension values can be represented by a different, second type of indicator, e.g., an empty circle. This indicates to a user that no flights could be identified that satisfies the currently specified dimension values. Other ways of representing certain destinations for which flights can be identified that satisfy particular dimension values in a visually distinct matter from other destinations on the map are possible.

In response to receiving data specifying a new value for one or more dimensions, the system may obtain updated minimum prices for flights to the destinations included in the map that satisfy each dimension value, including the new dimension value. The system can then update how particular destinations are represented on the map as described above.

While the above map functionality has been described with respect to displaying potential destinations of a trip from a particular origin, in some implementations, if the system receives an input that indicates that a user is interested in potential origins for a specific destination, the system displays potential origins from the destination instead of potential destination. The system can select the potential origins to be represented in the map as described above. Additionally, in response to identifying a map interaction, the system can adjust the potential origins that are represented on the map as described above. The system can determine that a user is interested in potential origins for a specific destination in response to a user input user that, for example, specifies a destination location when an origin has not been specified or deletes a specified origin location when a destination location has been specified.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and anyone or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain 10 implementations, multitasking and parallel processing may be advantageous.

We claim:

1. A system, comprising:
   one or more computing devices operable to perform operations to render graphical user interfaces comprising potentially obscured features in response to receiving a first user interaction with a map of a client computing device, the operations comprising:
   identifying an origin location;
   determining a first level of zoom of the map in accordance with the first user interaction, and determining a first position of the map in accordance with the first user interaction;
   identifying a plurality of ranked candidate destinations based on the identified origin location;
   selecting a first set of destinations from the ranked candidate destinations for inclusion in the map based on the first level of zoom of the map and the first position of the map;

determining each destination in the first set of destinations for which a destination location indicator would be obscured in the map by a destination location indicator of a higher ranked destination;

deselecting, to form a revised first set of destinations, each destination for which a destination location indicator has been determined to be obscured in the map by a destination location indicator of a higher ranked destination; and transmitting, to the client device, for display in the map, instructions to display the destination location indicator for each destination in the revised first set of destinations.

2. The system of claim 1, wherein the operations further comprise:

responsive to a second user interaction different from the first user interaction with the map:

determining a second level of zoom of the map in accordance with the second user interaction;

determining a second position of the map in accordance with the second user; and selecting a second set of one or more destinations from the ranked candidate destinations for inclusion in the map based on the second level of zoom of the map and the second position of the map, wherein the second set of destinations includes at least one destination not included in the first set of destinations;

determining each destination in the second set of destinations for which a destination location indicator would be obscured in the map by a destination location indicator of a higher ranked destination;

deselecting, to form a revised second set of destinations, each destination for which a destination location indicator has been determined to be obscured in the map by a destination location indicator of a higher ranked destination; and transmitting, to the client device, for display in the map, instructions to display destination location indicator for each destination in the revised second set of destinations.

3. The system of claim 2, wherein the second user interaction comprises a user input adjusting the first level of zoom of the map to produce the second level of zoom of the map.

4. The system of claim 2, wherein the second user interaction comprises a user input adjusting the first position of the map to produce the second position of the map.

5. The system of claim 1, wherein selecting the first set of destinations for inclusion in the map comprises:

determining that a particular candidate destination location indicator is visible on the map based on the first zoom level of the map and the first position of the map.

6. The system of claim 1, further comprising:

identifying, by the one or more data processing apparatuses, a minimum fare from among a plurality of fares for each of a plurality of the selected destinations from the origin location, the minimum fare being a minimum fare of a flight to the selected destination that satisfies each of a plurality of non-price dimension values; and for each selected destination for which the minimum fare satisfies a maximum fare dimension value, transmitting, to the client device, instructions to represent the selected destination with a first type of indicator on the map and displaying the respective minimum fare for the destination with the indicator on the map.

7. The system of claim 6, further comprising:

for each selected destination for which the minimum fare does not satisfy the maximum fare dimension value, transmitting, to the client device, instructions to represent the selected destination with the first type of indicator on the map and refraining from displaying the respective minimum fare for the selected destination with the indicator on the map.

8. A computer implemented method to render graphical user interfaces comprising potentially obscured features in response to receiving a first user interaction with a map of a client computing device, comprising:

identifying an origin location;

determining a first level of zoom of the map in accordance with the first user interaction;

determining a first position of the map in accordance with the first user interaction;

identifying a plurality of ranked candidate destinations based on the identified origin location;

selecting a first set of destinations from the ranked candidate destinations for inclusion in the map based on the first level of zoom of the map and the first position of the map;

determining each destination in the first set of destinations for which a destination location indicator would be obscured in the map by a destination location indicator of a higher ranked destination;

deselecting, to form a revised first set of destinations, each destination for which a destination location indicator has been determined to be obscured in the map by a destination location indicator of a higher ranked destination; and transmitting, to the client device, for display in the map, instructions to display destination location indicator for each destination in the revised first set of destinations.

9. The computer implemented method of claim 8, wherein the operations further comprise:

responsive to a second user interaction different from the first user interaction with the map:

determining a second level of zoom of the map in accordance with the second user interaction;

determining a second position of the map in accordance with the second user;

selecting a second set of one or more destinations from the ranked candidate destinations for inclusion in the map based on the second level of zoom of the map and the second position of the map, wherein the second set of destinations includes at least one destination not included in the first set of destinations;

determining each destination in the second set of destinations for which a destination location indicator would be obscured in the map by a destination location indicator of a higher ranked destination;

deselecting, to form a revised second set of destinations, each destination for which a destination location indicator has been determined to be obscured in the map by a destination location indicator of a higher ranked destination; and transmitting, to the client device, for display in the map, instructions to display the destination location indicator for each destination in the revised second set of destinations.

10. The method of claim 9, wherein the second user interaction comprises a user input adjusting the first level of zoom of the map to produce the second level of zoom of the map.

11. The system method of claim 9, wherein the second user interaction comprises a user input adjusting the first position of the map to produce the second position of the map.

12. The method of claim 8, wherein selecting the first set of destinations for inclusion in the map comprises:
   determining that a particular candidate destination location indicator is visible on the map based on the first zoom level of the map and the first position of the map.

13. The method of claim 8, further comprising:
   identifying, by the one or more data processing apparatuses, a minimum fare from among a plurality of fares for each of a plurality of the selected destinations from the origin location, the minimum fare being a minimum fare of a flight to the selected destination that satisfies each of a plurality of non-price dimension values; and
   for each selected destination for which the minimum fare satisfies a maximum fare dimension value, transmitting, to the client device, instructions to represent the selected destination with a first type of indicator on the map and displaying the respective minimum fare for the destination with the indicator on the map.

14. The system of claim 13, further comprising:
   for each selected destination for which the minimum fare does not satisfy the maximum fare dimension value, transmitting, to the client device, instructions to represent the selected destination with the first type of indicator on the map and refraining from displaying the respective minimum fare for the selected destination with the indicator on the map.

15. A computer program product, comprising:
   a non-transitory computer-readable storage device having computer-executable program instructions embodied thereon that when executed by a computer cause the computer to render graphical user interfaces comprising potentially obscured features in response to receiving a first user interaction with a map of a client computing device, the instructions comprising:
   instructions to identify an origin location;
   instructions to determine a first level of zoom of the map in accordance with the first user interaction;
   instructions to determine a first position of the map in accordance with the first user interaction;
   instructions to identify a plurality of ranked candidate destinations based on the identified origin location;
   instructions to select a first set of destinations from the ranked candidate destinations for inclusion in the map based on the first level of zoom of the map and the first position of the map;
   instructions to determine each destination in the first set of destinations for which a destination location indicator would be obscured in the map by a destination location indicator of a higher ranked destination;
   instructions to deselect, to form a revised first set of destinations, each destination for which a destination location indicator has been determined to be obscured in the map by a destination location indicator of a higher ranked destination; and
   instructions to transmit, to the client device, for display in the map, instructions to display the destination location indicator for each destination in the revised first set of destinations.

16. The computer program product of claim 15, wherein the instructions further comprise:
   instructions, responsive to a second user interaction different from the first user interaction with the map:
      to determine a second level of zoom of the map in accordance with the second user interaction;
      to determine a second position of the map in accordance with the second user; and
      to select a second set of one or more destinations from the ranked candidate destinations for inclusion in the map based on the second level of zoom of the map and the second position of the map, wherein the second set of destinations includes at least one destination not included in the first set of destinations;
      to determine each destination m the second set of destinations for which a destination location indicator would be obscured in the map by a location indicator of a higher ranked destination;
      to deselect, to form a revised second set of destinations, each destination for which a destination location indicator has been determined to be obscured in the map by a location indicator of a higher ranked destination; and
      to transmit, to the client device, for display in the map, instructions to display the location indicator for each destination in the revised second set of destinations.

17. The computer program product of claim 16, wherein the second user interaction comprises a user input adjusting the first level of zoom of the map to produce the second level of zoom of the map.

18. The computer program product of claim 16, wherein the second user interaction comprises a user input adjusting the first position of the map to produce the second position of the map.

19. The computer program product of claim 15, wherein selecting the first set of destinations for inclusion in the map comprises:
   determining that a particular candidate destination location indicator is visible on the map based on the first zoom level of the map and the first position of the map.

20. The computer program product of claim 15, wherein the instructions further comprise:
   instructions to identify a minimum fare from among a plurality of fares for each of a plurality of the selected destinations, the minimum fare being a minimum fare of a flight to the selected destination from the origin location that satisfies each of a plurality of non-price dimension values; and
   for each selected destination for which the minimum fare satisfies a maximum fare dimension value, transmitting, to the client device, instructions to represent the selected destination with a first type of indicator on the map and displaying the respective minimum fare for the destination with the indicator on the map.

* * * * *